United States Patent
Boscaljon et al.

[11] Patent Number: 6,050,609
[45] Date of Patent: Apr. 18, 2000

[54] POSITIVE LOCK COUPLING

[75] Inventors: Ronald W. Boscaljon, Denver; Ronald A. Rossway, Aurora; David E. Jewell, Golden, all of Colo.

[73] Assignee: Stanley Aviation Corporation, Aurora, Colo.

[21] Appl. No.: 09/070,230

[22] Filed: Apr. 30, 1998

Related U.S. Application Data

[63] Continuation-in-part of application No. 08/741,647, Oct. 31, 1996, Pat. No. 5,871,239.

[51] Int. Cl.$^7$ ...................................................... F16L 35/00
[52] U.S. Cl. .............................. 285/81; 285/92; 285/354; 285/357
[58] Field of Search ................................. 285/92, 81, 86, 285/233, 354, 357

[56] References Cited

U.S. PATENT DOCUMENTS

| | | | |
|---|---|---|---|
| 3,201,149 | 8/1965 | Bragg | 285/86 |
| 3,999,825 | 12/1976 | Cannon | 339/15 |
| 4,008,937 | 2/1977 | Filippi | 339/15 |
| 4,249,786 | 2/1981 | Mahoff | 339/15 |
| 4,285,564 | 8/1981 | Spinner | 339/89 |
| 4,346,428 | 8/1982 | Gale | 361/261 |
| 4,757,593 | 7/1988 | Pallini, Jr. et al. | 285/92 |
| 4,785,858 | 11/1988 | Valentini et al. | 285/92 |
| 4,808,117 | 2/1989 | Gale et al. | 439/192 |
| 4,881,760 | 11/1989 | Runkles et al. | 385/93 |
| 4,900,070 | 2/1990 | Runkles et al. | 285/233 |
| 4,928,202 | 5/1990 | Gale et al. | 361/215 |
| 5,188,398 | 2/1993 | Parimore, Jr. et al. | 285/92 |
| 5,215,336 | 6/1993 | Worthing | 285/92 |
| 5,348,349 | 9/1994 | Sloane | 285/92 |
| 5,350,200 | 9/1994 | Peterson et al. | 285/92 |
| 5,746,454 | 5/1998 | Webb | 285/92 |
| 5,851,035 | 12/1998 | Marc et al. | 285/92 |

FOREIGN PATENT DOCUMENTS

| | | | |
|---|---|---|---|
| 99293 | 1/1984 | European Pat. Off. | 285/92 |

*Primary Examiner*—Eric K Nicholson
*Attorney, Agent, or Firm*—Fields and Johnson, P.C.

[57] ABSTRACT

A first coupling member has a peripheral facing surface with a pair of annular slots, each of a different length and width. A second coupling member has a lock ring longitudinally slidable thereon with a facing surface having a pair of annular raised locking tabs sized to correspond to the respective annular slots. A resilient annular spring mounted within the lock ring urges it toward the first coupling member so that the locking tabs engage their respective slots when the coupling is tightened to a predetermined extent during rotation in the locking direction to releasably and positively lock the coupling. An indicator stripe on the peripheral edge of the first coupling member is exposed before the locking tabs and slots are engaged. Alignment between the respective locking tabs and slots allows longitudinal movement of the lock ring so that it covers the indicator stripe. One of the coupling members has a peripheral groove and two angularly spaced longitudinal keyways of differing widths which intersect the peripheral groove. The annular spring has an internal peripheral edge with a plurality of peripherally spaced spring tabs for holding it in the peripheral groove. A spring key on the internal peripheral edge of the annular spring has a width corresponding to the width of one of the keyways to rotationally position the annular spring with the coupling member. The annular wall of the lock ring has two angularly spaced keys of differing widths which correspond to the widths of the keyways and are received therein to angularly position the lock ring with the coupling member and the spring.

17 Claims, 13 Drawing Sheets

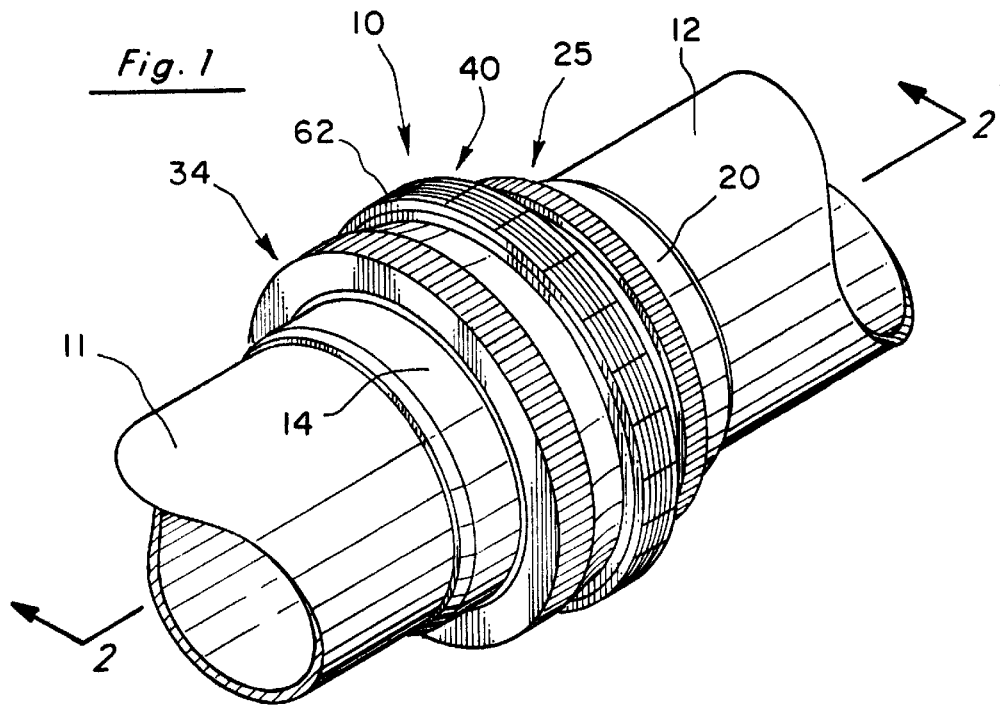
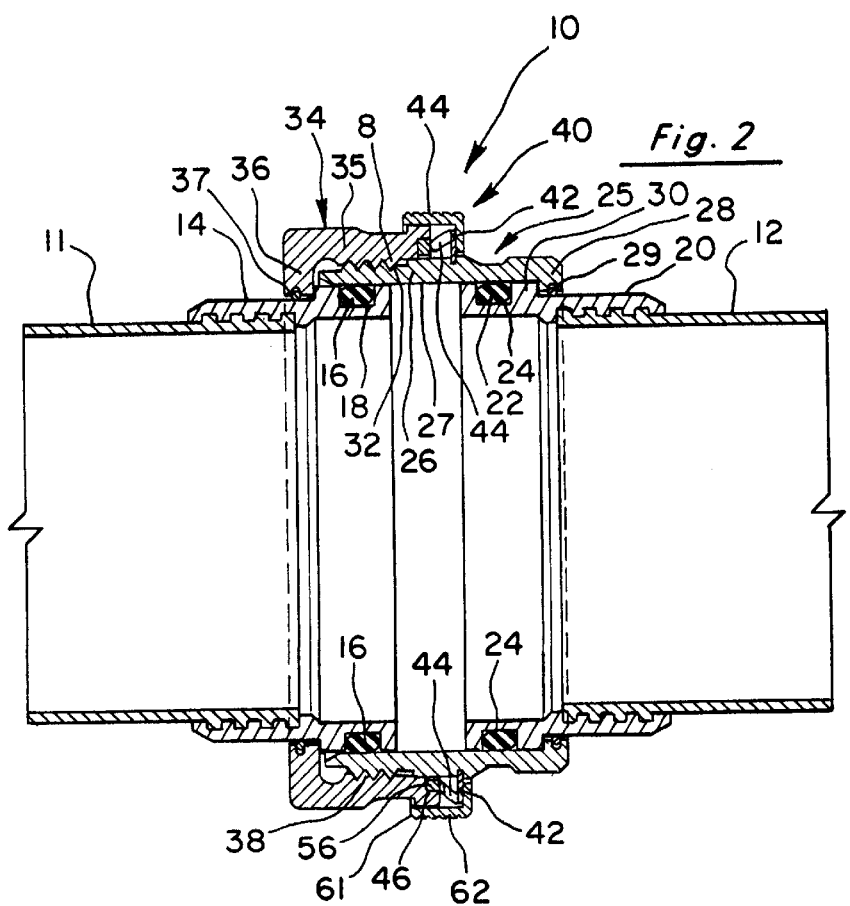

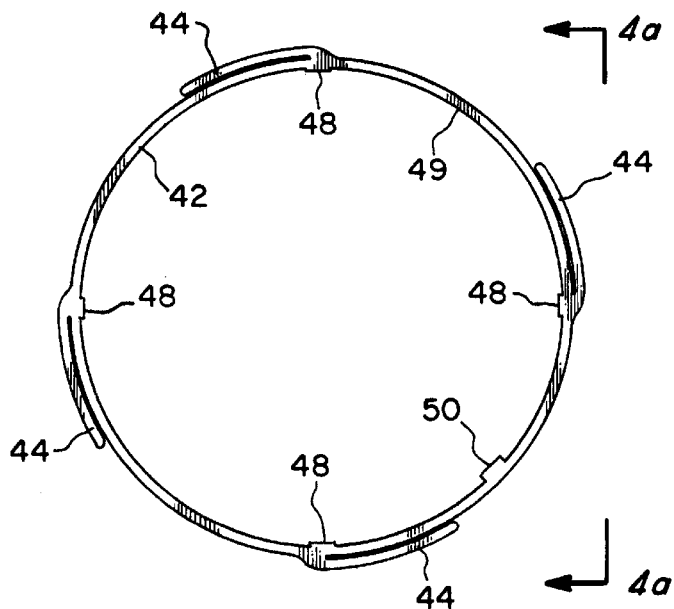
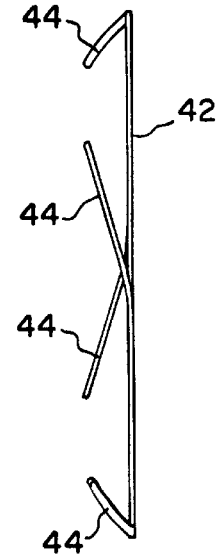
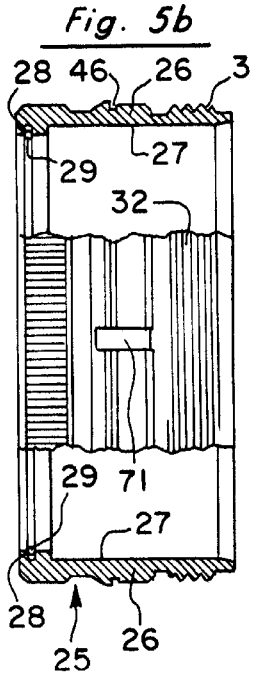
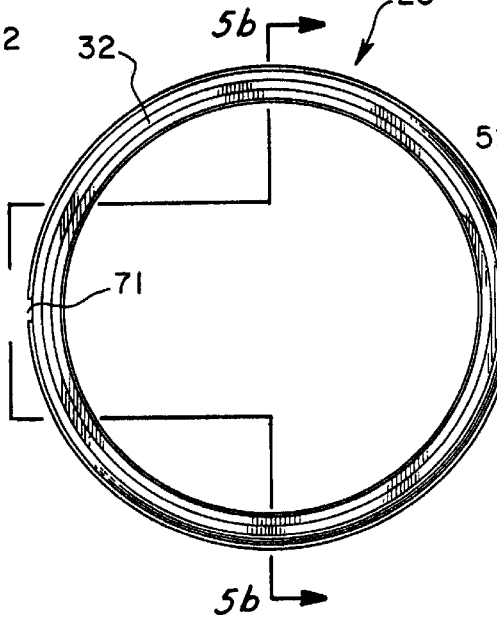
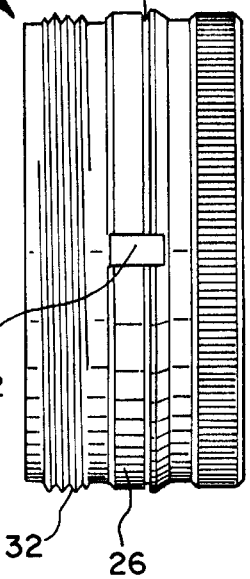

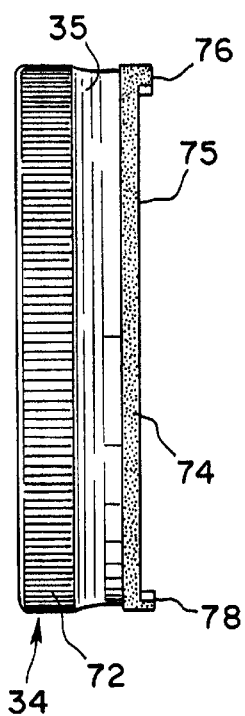
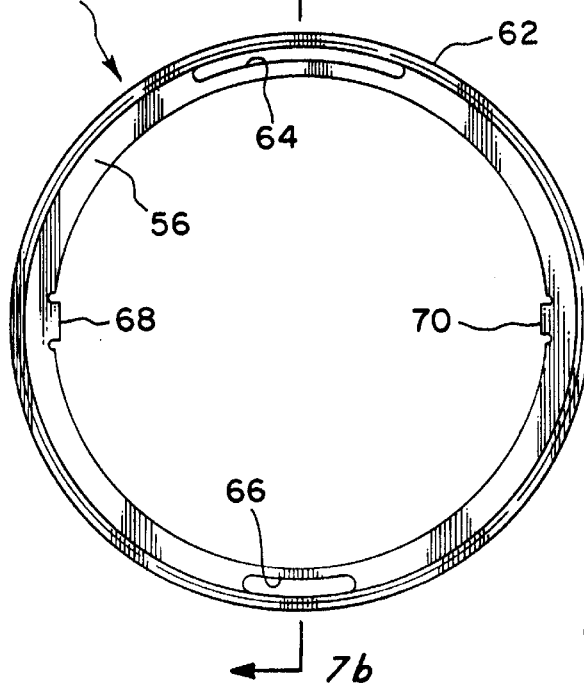
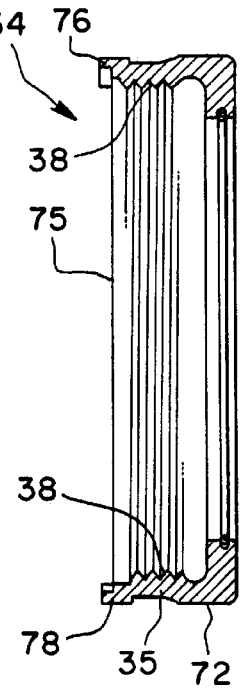
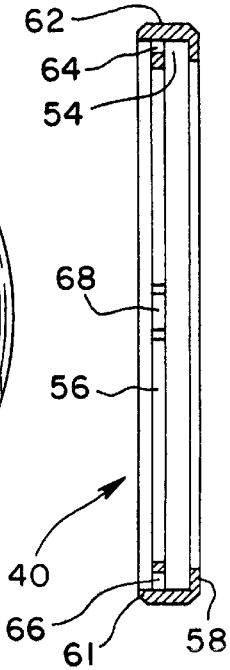

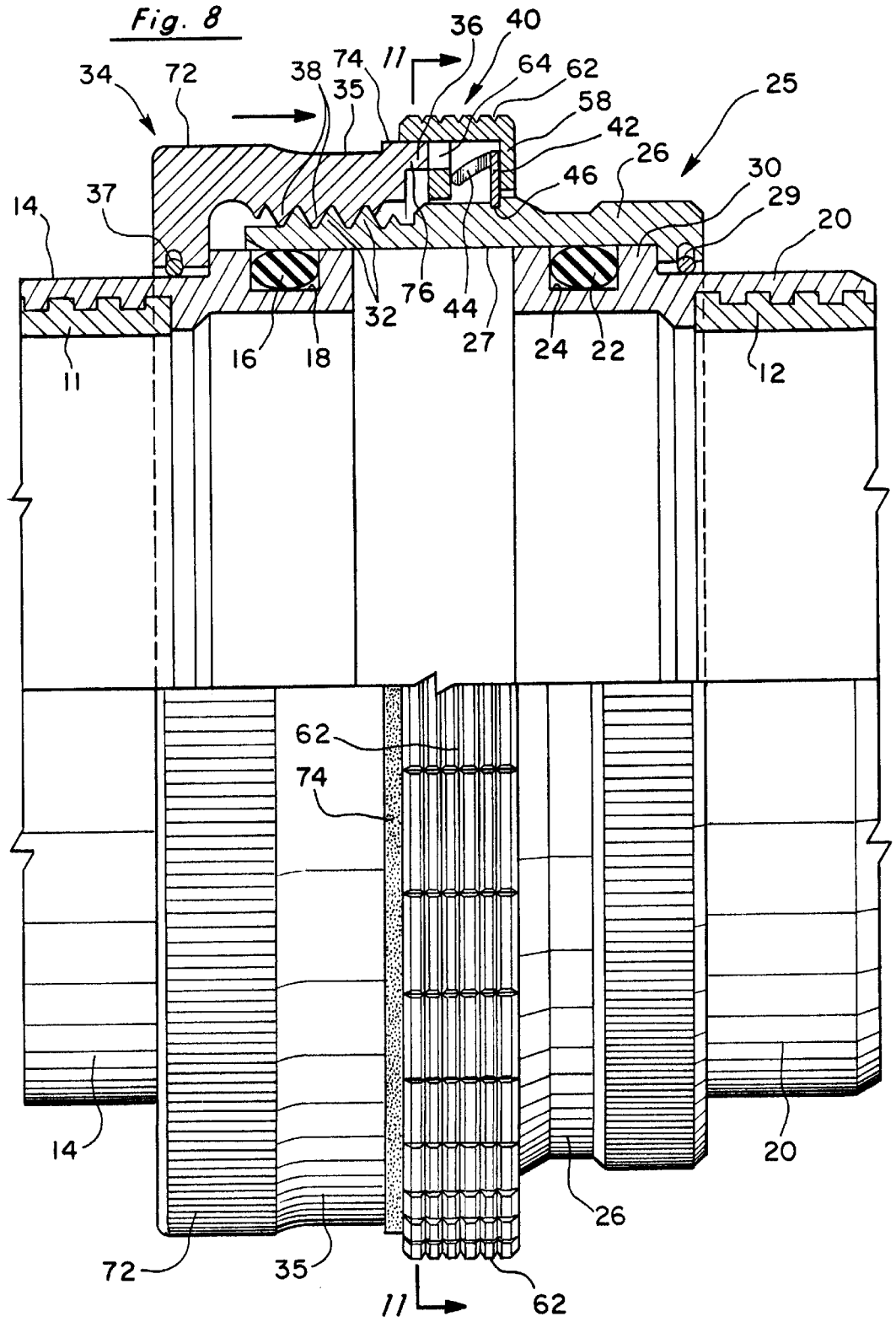

POSITIVE LOCK COUPLING

This invention is a continuation-in-part application of U.S. Ser. No. 08/741,647, filed Oct. 31, 1996, and entitled "Positive Lock Coupling" Now U.S. Pat. No. 5,871,239.

TECHNICAL FIELD

This invention relates to a threaded coupling assembly for interconnecting confronting ends of first and second fluid-carrying conduits in an aircraft. More particularly, the coupling assembly has a releasably positive lock which utilizes a lock ring with biasing spring to assure that the coupling will not accidentally become uncoupled due to vibration of the aircraft and includes indicia so that the mechanic can visually observe whether or not the coupling is positively locked.

BACKGROUND ART

Aircraft fuel systems include a large number of couplings which must be easy to connect, must provide a positive lock when connected and should include means for visually determining whether or not the coupling is secure. Also, because of the tight space constraints within an aircraft, the mechanic preferably should be able to lock and unlocked the coupling assembly with one hand. Various couplings have been developed with one or more of these objectives in mind.

Nadsady U.S. Pat. No. 3,669,472; Gale et al. U.S. Pat. No. 4,808,117 and Gale et al. U.S. Pat. No. 4,928,202 each disclose a coupling device in which the tightening of the coupling parts is readily accomplished but accidental loosening is restrained by spring fingers carried by one of the coupling parts which engage indentations or notches on the other coupling part in such a manner as to favor relative rotation of the coupling parts in the tightening direction while restraining with greater force the rotation of the coupling parts in the opposite unlocking direction.

Cannon U.S. Pat. No. 3,999,825; Filippi U.S. Pat. No. 4,008,937; Mahoff U.S. Pat. No. 4,249,786 and Gale U.S. Pat. No. 4,346,428 each disclose a coupling with one or more toggle latches which snap into a positive locking position.

Spinner U.S. Pat. No. 4,285,564 discloses a coaxial plug connector wherein a first ring of axially pointed teeth is provided around the circumference of a cap ring. A first connector has a ring with teeth for engaging the teeth on the cap ring. The cap ring is withdrawn axially against the force of a biasing spring when the coupling is rotated to a different position. The cap ring is released and the spring urges it into locking engagement with the tooth ring. Thus, accidental rotation of the cap ring relative to the first connector is prevented.

Runkles et al. U.S. Pat. No. 4,881,760 discloses a coupling with locking tines having visible indicia for determining whether or not the tines are in locked position.

Runkles et al. U.S. Pat. No. 4,900,070 discloses a coupling with spring biased rotatable locking tines.

Although each of the prior art references is suitable for its intended purpose, none meet the need for a positive lock on a threaded coupling which is easy to secure with one hand, and, on the other hand, provides a positive but releasable locking connection which has indicia to indicate whether or not the positive lock feature is engaged.

DISCLOSURE OF THE INVENTION

In accordance with the present invention, a threaded coupling assembly is provided for interconnecting the ends of first and second fluid-carrying conduit members in releasable locked relationship. First and second coupling members are provided for circumferentially engaging ends of the conduit members to hold them in fluid communication. Conveniently, the coupling members are rotatable in both a locking direction and an opposite unlocking direction. Each of the first and second coupling members has a peripheral facing surface with a complementary locking element thereon. A resilient member urges the peripheral facing surfaces toward each other so that at least one of the locking elements on one of the peripheral facing surfaces engages the other peripheral facing surface during rotation in the locking direction to bring the locking elements into aligned locking engagement.

More particularly, in a first embodiment, a relief is provided by a first peripheral surface which is in the form of a first arcuate slot having a particular length and width. A first protrusion is provided by a second confronting peripheral surface in the form of a first locking tab which is sized and configured to be received within the first arcuate slot. Advantageously, a second arcuate slot can be provided on the first peripheral surface peripherally spaced from the first arcuate slot and having a different length and width than the first arcuate slot. A second protrusion is provided on the second confronting peripheral surface in the form of a second locking tab which is sized and configured to be received within the second arcuate slot. Because of the differences in sizes of the respective slots and locking tabs, the first locking tab cannot enter the second slot and the second locking tab cannot enter the first slot. Thus, the coupling members must be rotated in the locking direction sufficiently for the locking tabs to be aligned with their corresponding slots before locking engagement can occur. In this way, it is possible to provide a secure, but releasable, lock on a fluid coupling.

In a second and third embodiment, the respective pairs of slots and protrusions are of substantially the same length and width but are radially offset to perform the same function.

A lock ring is mounted around and secured to one of the coupling members and has one of the confronting faces positioned thereon. A resilient member in the form of an annular spring urges the lock ring toward the confronting face of the other coupling member. Thus, proper alignment between the locking tabs on corresponding confronting faces results in engagement between the respective locking tabs and slots when they are aligned.

Advantageously, the lock ring has an annular wall forming one of the confronting faces and an internal peripheral retaining groove in which the annular spring is positioned. This assembly, of the lock ring with the annular spring therein, is mounted on one of the coupling members which has a peripheral groove and two angularly spaced longitudinal keyways of differing widths which intersect the peripheral groove. The annular spring has an internal peripheral edge with a plurality of peripherally spaced spring tabs for holding it in the peripheral groove. The annular spring also has a spring key extending from its internal peripheral edge which has a width corresponding to the width of one of the keyways to rotationally position it with respect to the coupling member. The annular wall of the lock ring has two angularly spaced keys of differing widths which correspond to the widths of the keyways and are received therein to angularly position the lock ring with respect to the coupling member.

Conveniently, indicia in the form of an indicator stripe may be provided around the outer peripheral surface of coupling member whose face is engaged against the face of the lock ring. This indicator stripe has a maximum width equal to the height of the locking tabs and corresponding to the pitch of the threads. Thus, during rotation of the coupling members in the locking direction, the indicator stripe will be exposed thus indicating that a positive locking engagement between the coupling members has not yet been achieved. However, when the locking tabs become aligned with the corresponding arcuate slots of complementary size and shape, the lock ring will suddenly move longitudinally a distance equal to the height of the locking tabs and cover the indicator stripe. When the indicator stripe can no longer be seen, a mechanic knows that positive locking engagement of the coupling has occurred.

Additional advantages of this invention will become apparent from the detailed description which follows, taken in conjunction with the accompanying drawings.

BRIEF DESCRIPTION OF THE DRAWINGS

FIG. 1 is a perspective view of one embodiment of the coupling of the present invention;

FIG. 2 is an enlarged longitudinal section, taken along line 2—2 of FIG. 1, showing details of the coupling;

FIG. 4 is a front elevation of the annular spring for the lock ring of the embodiment of FIG. 1;

FIG. 4a is a right side elevation of the annular spring taken in the direction of line 4a—4a in FIG. 4;

FIG. 5 is a front elevation of the coupler of the embodiment of FIG. 1;

FIG. 5a is a right side elevation of the coupler of FIG. 5;

FIG. 5b is an offset vertical section, taken along line 5b—5b of FIG. 5;

FIG. 6 is a front elevation of the nut of the embodiment of FIG. 1;

FIG. 6a is a left side elevation of the nut of FIG. 6;

FIG. 6b is a vertical section taken along line 6b—6b of FIG. 6;

FIG. 7 is a front elevation of the lock ring of the embodiment of FIG. 1;

FIG. 7a is a left side elevation of the lock ring of FIG. 7;

FIG. 7b is a vertical section taken along line 7b—7b of FIG. 7;

FIG. 8 is a greatly enlarged side elevation of the coupling shown in FIG. 2 as the threading of the coupling assembly in the locking direction is begun, with parts broken away for clarity of illustration;

BEST MODE FOR CARRYING OUT THE INVENTION

Figure 3:
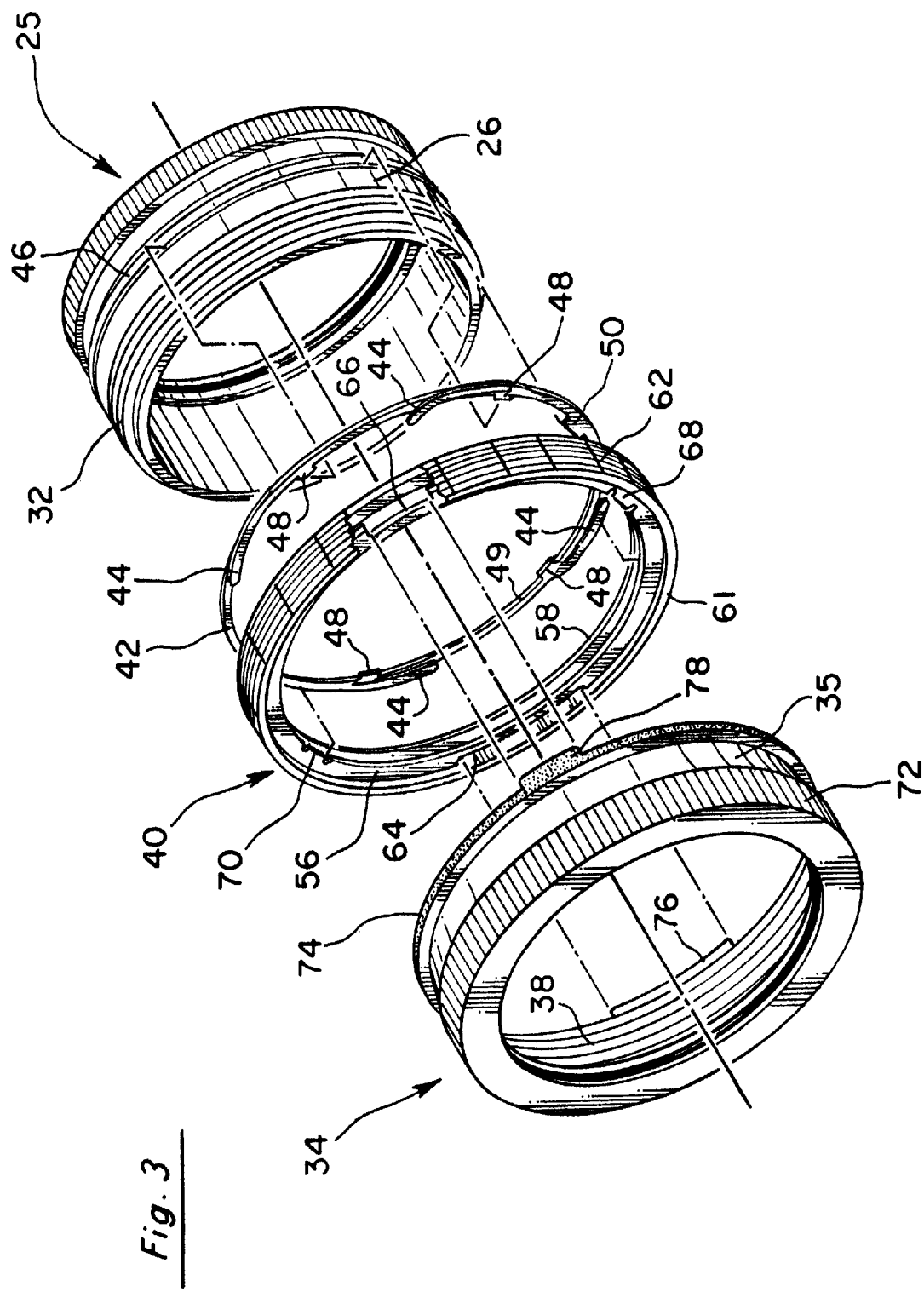
FIG. 3 is an exploded perspective view of the coupling of FIG. 1.

In accordance with this invention, a first flexible coupling assembly 10 is provided for interconnecting fluid carrying tubes or conduits 11 and 12 in fluid communicating relationship. Conduit 11 has a peripheral sealing flange 14 securely attached thereto which includes an O-ring 16 within peripheral groove 18. Similarly, conduit 12 has a peripheral sealing flange 20 securely attached thereto which includes an O-ring 22 within peripheral groove 24.

Conveniently, coupling assembly 10 has a first coupling member, such as coupler 25 having a generally cylindrical body 26 whose inner surface 27 is in fluid-tight relationship with O-rings 16 and 22, respectively. Body 26 has a peripheral flange 28 at one end which engages a stop in the form of peripheral rib 30 on sealing flange 20. A peripheral, resilient, electrically conductive bonding wire 29 is mounted in the inner peripheral edge of flange 28 and contacts the outer surface of sealing flange 20 to provide electrical continuity from flange 20, through the coupling 10, to flange 14. The opposite end of coupler 25 is provided with external threads 32.

A second coupling member in the form of nut 34 is mounted on flange 14 and has a generally cylindrical body 35 with a peripheral flange 36 which has a similar bonding wire 37 in contact with the outer surface of sealing flange 14 to provide electrical continuity. Nut 34 has internal threads 38 which engage external threads 32 of coupler 25. These threads are first and second cooperating elements which cause coupler 25 and nut 34 to be drawn together longitudinally into a locked position, as will be more fully explained below. This structure permits some longitudinal and angular adjustments between conduits 11 and 12.

A locking element in the form of a lock ring 40 is mounted about the outer periphery of coupler 25 by means of annular spring 42 for longitudinal movement with respect to coupler 25 and nut 34, as more fully described below. The structure of coupler 25, nut 34, lock ring 40, and annular spring 42 can best be understood by looking at FIGS. 3–7.

Annular spring 42 includes about its outer periphery a plurality of spring fingers 44 which extend at an angle to the plane of annular spring 42, as best seen and FIG. 4a. Although four fingers have been shown, it will be apparent to one of ordinary skill in the art that a lesser or greater number could be provided. Also, the fingers can be arranged to extend from the opposite side of the annular spring. Annular spring 42 is mounted within peripheral groove 46 on coupler 25 by spring tabs 48. These tabs are illustrating as extending from the inner peripheral edge 49 of annular spring 42 opposite the juncture of spring fingers 44 with the annular spring 42, but can be positioned anywhere around the inner peripheral edge. A larger or lesser number of tabs could be provided. As shown in FIGS. 4 and 5, a key 50, which also extends from the inner periphery of annular spring 42, is received in keyway 52 in coupler 25 for positioning annular spring 42 in fixed rotational position with respect to coupler 25. Prior to mounting lock ring 40 on coupler 25, annular spring 42 is deformed so as to be snapped into an internal peripheral retaining groove 54 formed in lock ring 40 between annular wall or web 56 and depending peripheral shoulder 58 so that the spring fingers 44 contact the web 56. Once annular spring 42 is positioned within lock ring 40, this assembly is slid over threads 32 of coupler 25 until the spring tabs 48 of the inner peripheral edge 49 of spring 42 is received in peripheral groove 46, as best seen in FIGS. 2 and 8. Conveniently, lock ring 40 has a peripheral flange 61 with a scored outer surface 62 for grasping the lock ring to move it laterally against the force of spring fingers 44, all as more fully discussed below.

Advantageously, web or wall 56 of lock ring 40 is a peripheral facing surface which has a first complementary locking element which has configurations in the form of reliefs which comprise a relatively long narrow annular slot 64 and relatively wide short annular slot 66 located opposite each other. Stated another way, annular slot 64 is radially narrower than is annular slot 66. The center of the annular slots, as measured from end to end, are spaced 180° from each other. A wide key 68 and a narrow opposing key 70 are provide on web 56 between annular slots 64 and 66. Conveniently, key 50 on annular spring 42 is aligned with wide key 68 when the annular spring is placed within the lock ring, as previously described. Thus, when this assembly is slid over the threads of coupler 25, wide key 68 is received in keyway 52 on coupler and narrow key 70 is received in narrow keyway 71 on the opposite side of coupler 25 from keyway 52 in order to properly align all of the parts.

Cylindrical body 35 of nut 34 has an exterior gripping surface 72 at the proximal end thereof and has indicia in the form of an indicator stripe 74 extending about the distal end of body 35. Extending from facing surface 75 at the distal end of body 35 is a second complementary locking element which is a protrusion having configurations in the form of a long, but radially narrow arcuate locking tab 76 and a short, but radially wide arcuate locking tab 78 located 180° from arcuate locking tab 76. These tabs are positioned and sized to be received within arcuate slots 64 and 66, respectively, of web 56 on lock ring 40.

Figure 11:
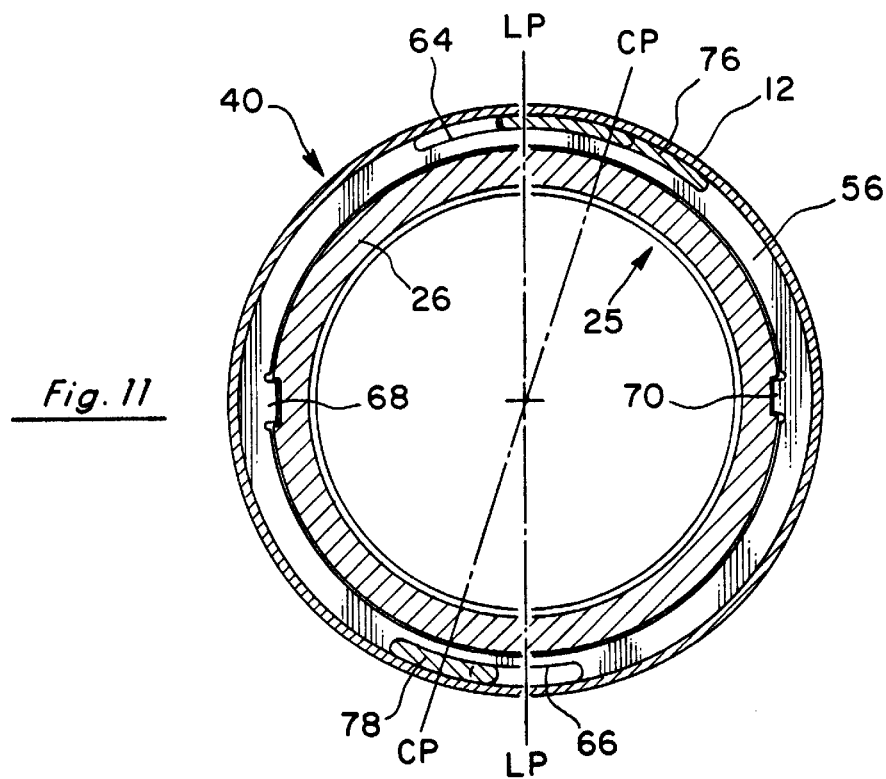
FIG. 11 is a vertical section, on a reduced scale, taken along line 11—11 of FIG. 8, showing the position of the nut when the confronting surfaces of the respective coupling members are brought into initial contact as they are threaded in the locking direction.
Figure 12:
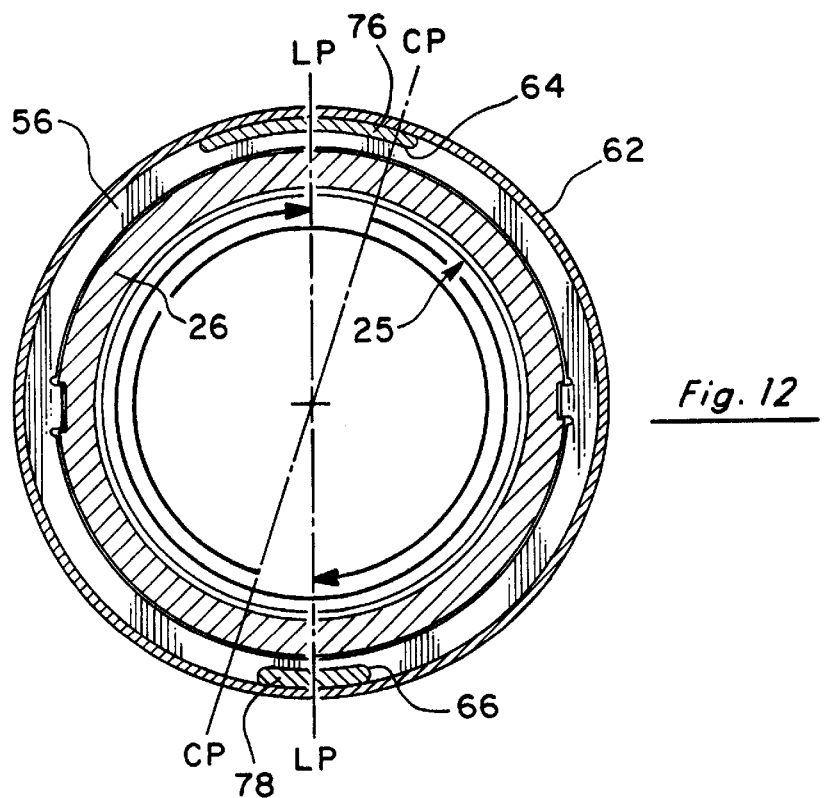
FIG. 12 is a vertical section, on a reduced scale, taken along line 12—12 of FIG. 10, showing the position of the nut when the coupling members are in a locked position.

From the foregoing, the operation the of the coupling will be apparent. After annular spring 42 has been placed within lock ring 40 and this assembly positioned on coupler 25, as previously described, nut 34 is threaded onto coupler 25. The threads 32 of the coupler 25 and threads 38 of nut 34 are located with respect to angular position and pitch so that long arcuate locking tab 76 and short arcuate locking tab 78 on nut 34 first engage web 56 of lock ring 40 in the rotational position CP shown in FIG. 11. When in this position, the facing surfaces of coupler 25 and lock ring 40 are brought together during rotation so that short arcuate locking tab 78 is positioned slightly clockwise past short arcuate slot 66 and long arcuate locking tab 76 is positioned slightly clockwise past long arcuate slot 64 when the respective locking tabs first come into contact with web 56. Upon further rotation, short arcuate locking tab 78 will become aligned with long arcuate slot 64 and long arcuate locking tab 76 will become aligned with short arcuate slot 66. However, since short arcuate locking tab 78 is radially thicker or wider than long arcuate slot 64, it cannot engage long arcuate slot 64 but rides along the surface of web 56. Conversely, since long arcuate locking tab 76 extends beyond the ends of short arcuate slot 66, it cannot enter arcuate slot 66 but rides along the surface of web 56. As nut 34 continues to be tightened, spring fingers 44 are compressed from the position shown in FIG. 8 to the position shown in FIG. 9 allowing lock ring 40 to move to the right relative to coupler 25 from the position shown in FIG. 8 to the position shown in FIG. 9. Advantageously, the arcuate locking tabs are raised above the facing surface 75 of body 35 a distance at least equal to the width of indicator stripe 74. Thus, indicator stripe 74 is visible to indicate that the coupling has not yet snapped into locked position. As nut 34 continues to be tightened slightly less than one full turn, it will reach locking position LP, in FIG. 12 wherein long locking tab 76 comes into alignment with long arcuate slot 64 and short locking tab 78 comes into alignment with short arcuate slot 66 so that lock ring 40 snaps to the left, as viewed in FIG. 10, under the force of spring fingers 44 to bring long locking tab 76 and short locking tab 78 into locking engagement with long arcuate slot 64 and short arcuate slot 66, respectively. By this action, lock ring 40 moves against annular spring 42 which serves as a retaining member to limit the longitudinal movement of lock ring 40. When this happens, indicator stripe 74 is no longer visible since the peripheral flange 61 of lock ring 40 moves over and covers the indicator stripe. Thus, nut 34 is securely engaged in a locking relationship with respect to lock ring 40 and, since the keys 68 and 70 of lock ring 40 are rotationally engaged with the keyways 52 and 71 of coupler 25, the nut 34 is securely engaged in a locking relationship with respect to coupler 25.

Figure 9:
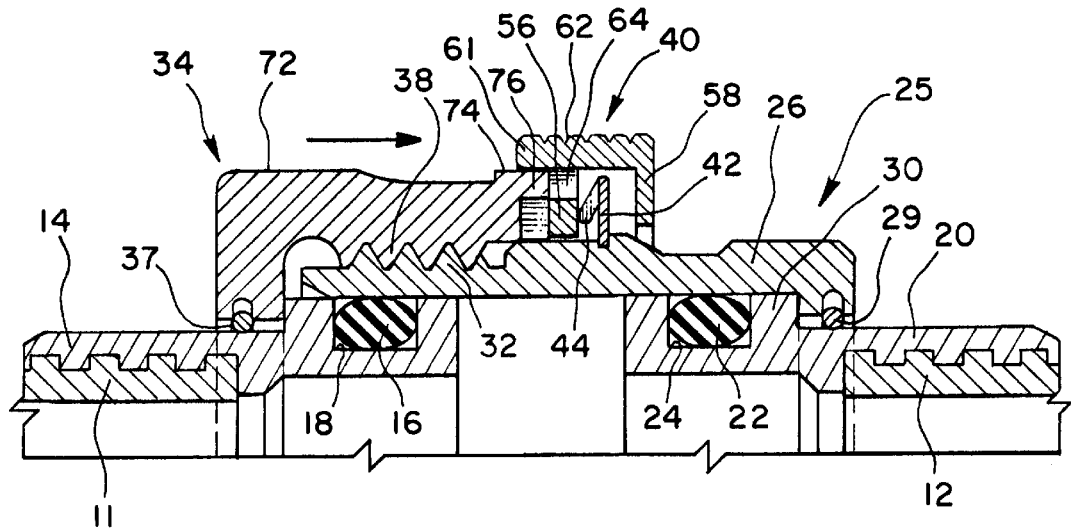
FIG. 9 is a fragmentary vertical section, similar to the upper portion of FIG. 8, showing the position of the coupling assembly just prior to reaching the position for locking engagement.
Figure 10:
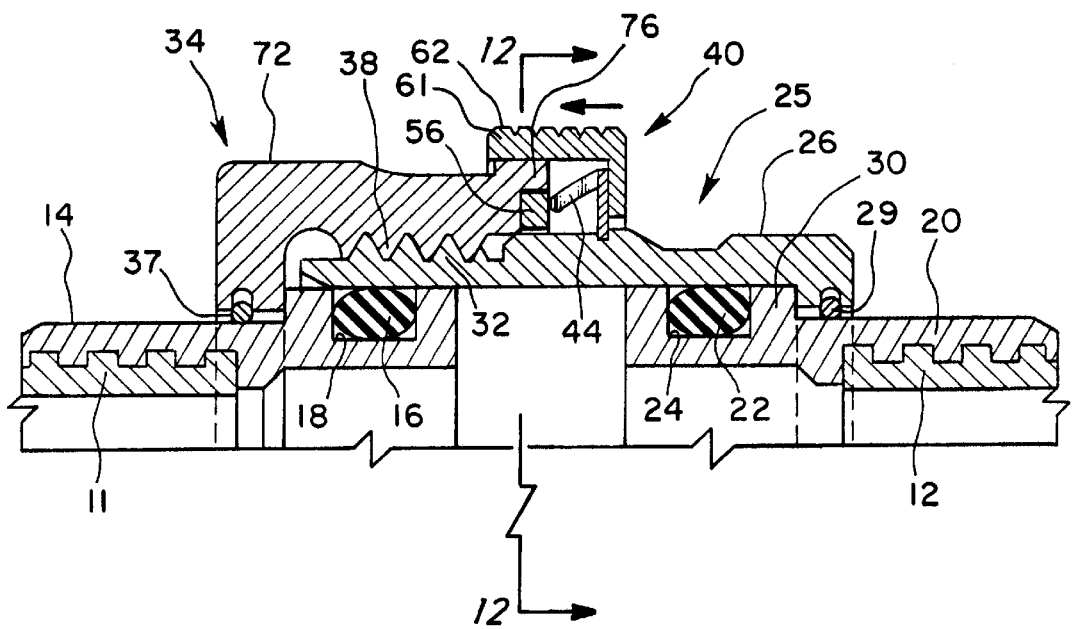
FIG. 10 is a fragmentary vertical section, similar to FIG. 9, but showing the position of the coupling assembly in locking engagement.

To release the coupling, the mechanic need only to push lock ring 40 to the right, as viewed in FIGS. 8–10, to disengage long locking tab 76 and short locking tab 78 from long arcuate slot 64 and short arcuate slot 66, respectively. Then, the mechanic can rotate nut 34 in the unlocking direction whereupon the locking tabs and their respective arcuate slots are no longer aligned. The lock ring 40 can be released as further rotation of nut 34 in the unlocking direction continues. It will be apparent that the mechanic can accomplish both the locking and unlocking of the coupling assembly 10 with one hand. This is important in the limited space in which a mechanic must work within an aircraft.

Figure 13:
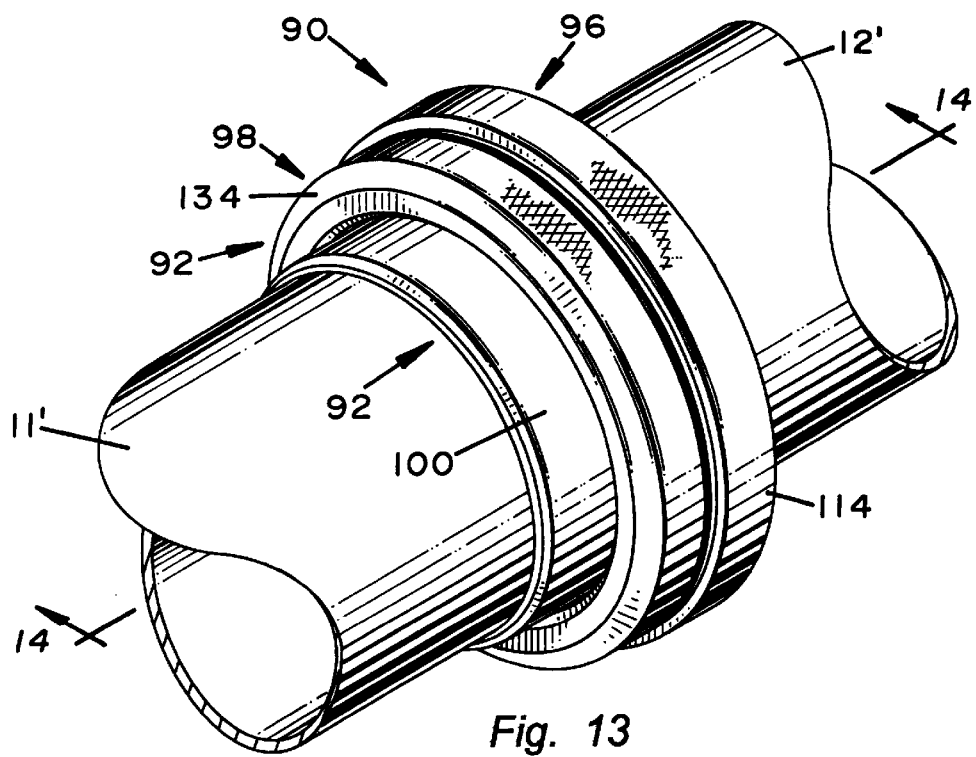
FIG. 13 is a perspective view of a second embodiment of the coupling assembly of this invention.
Figure 14:
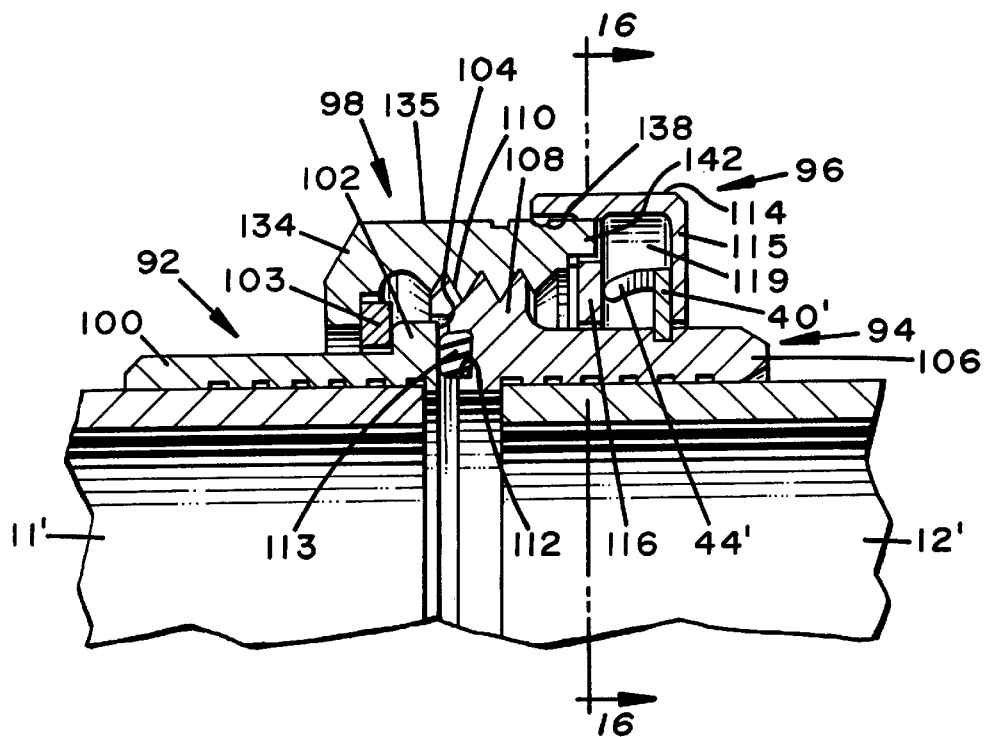
FIG. 14 is an enlarged fragmentary longitudinal section, taken along line 14—14 of FIG. 13.
Figure 15:
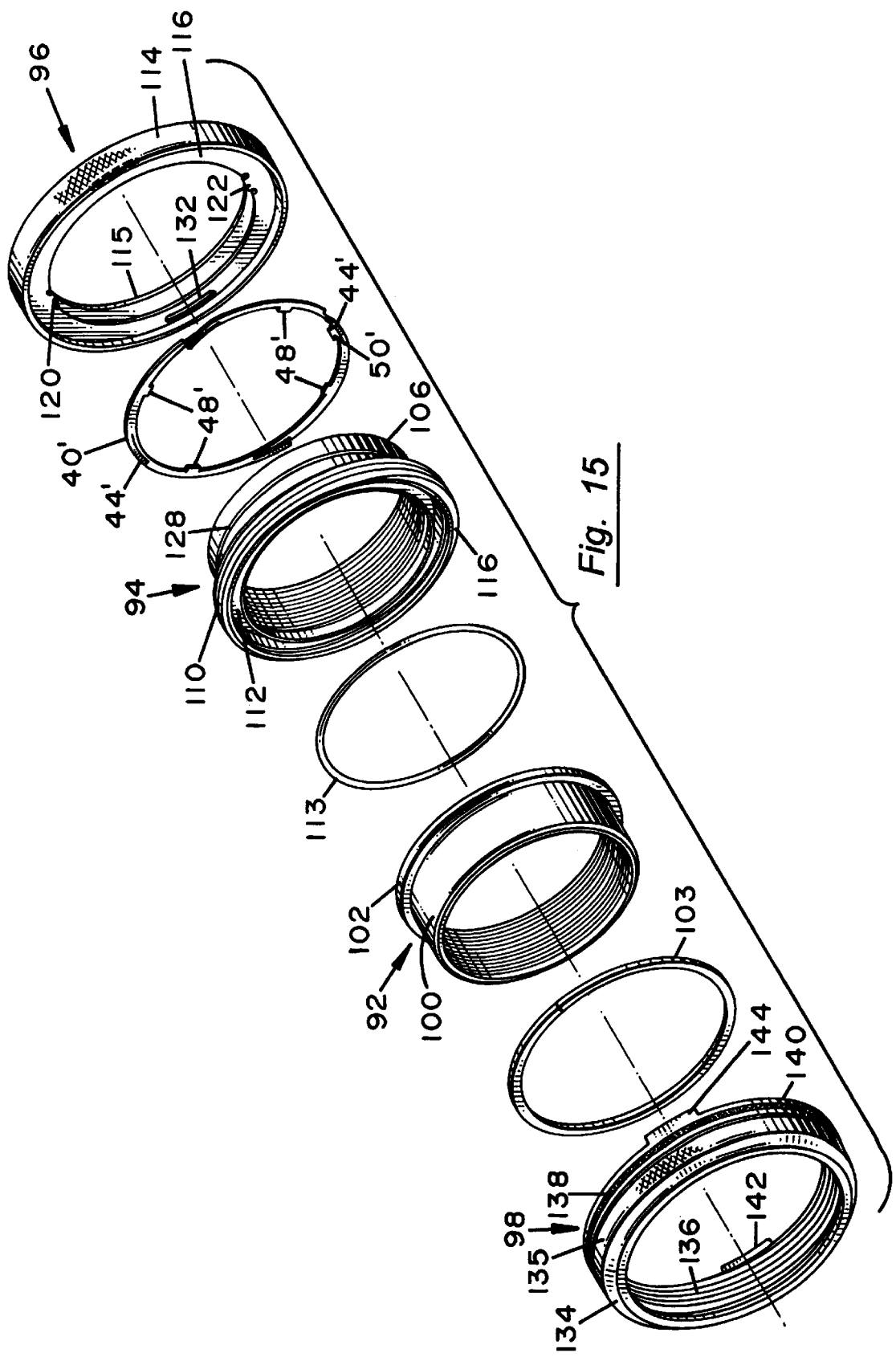
FIG. 15 is an exploded perspective view of the coupling assembly of FIG. 13.

A second embodiment is a rigid coupling assembly 90, as shown in FIGS. 13–18, wherein one of the sealing flanges has external threads of a larger diameter than the body of the sealing flange. This requires the sealing flange to be modified for mounting the lock ring and annular spring assembly, as described below, on the coupler. As best seen in FIGS. 13–15, coupling assembly 90 interconnects first and second coupling members, such as flange 92 and coupler 94 on conduits 11' and 12', respectively, so that the conduits are joined together in fluid communication. In addition, coupling assembly 90 comprises a lock ring 96, with annular spring 40' therein, and a lock nut 98. Annular spring 40' is similar to spring 40 which is shown in detail in FIGS. 4 and 4a of the previous embodiment.

Flange 92 has a generally cylindrical body 100 with an outwardly extending peripheral shoulder 102 that seats against a washer 103 in nut 98, as shown. Shoulder 102 has a facing peripheral sealing surface 104. Coupler 94 has a generally cylindrical body 106 with an outwardly extending flange 108 having threads 110 whose diameter is greater than that of cylindrical body 106. Flange 108 is undercut to form an annular recess 112 for receiving annular seal 113 which engages sealing surface 104 when the coupling assembly 90 is in the locked position show in FIG. 14.

Figure 16:
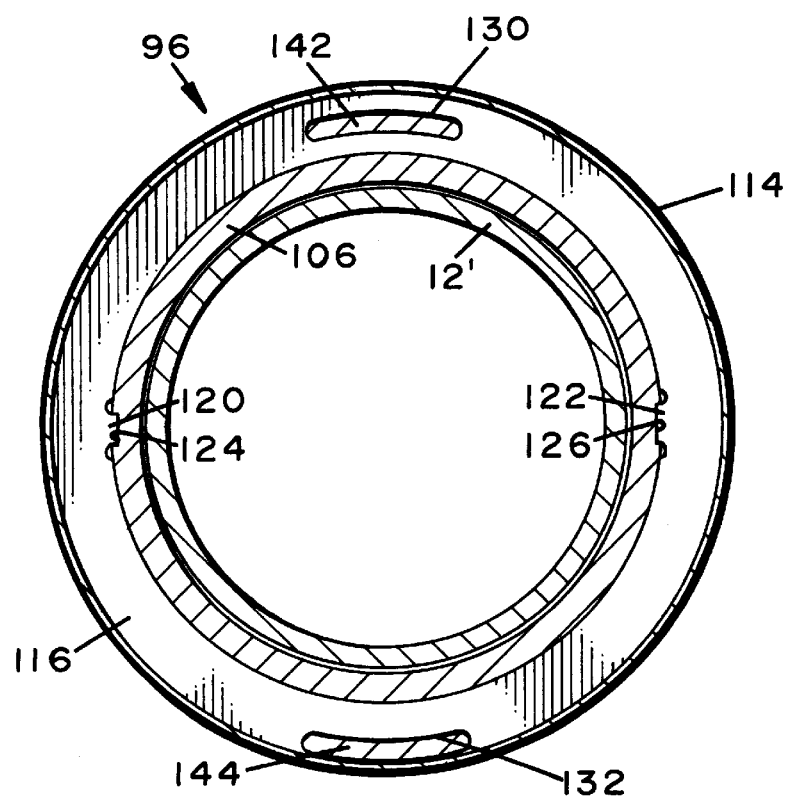
FIG. 16 is a vertical section, taken along line 16—16 of FIG. 14, showing the lock ring positioned on the coupling member.
Figure 17:
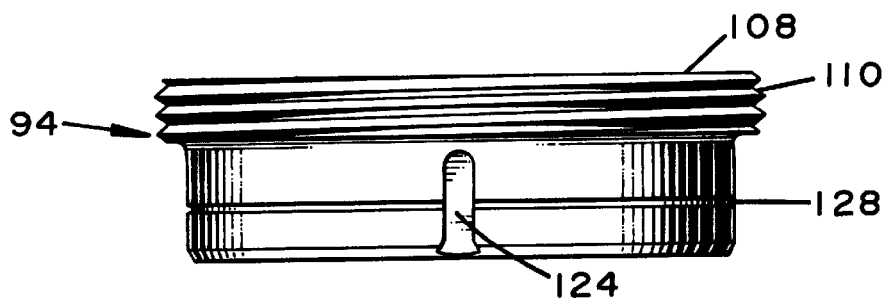
FIG. 17 is a left side elevation of the coupling member of FIG. 16.
Figure 18:
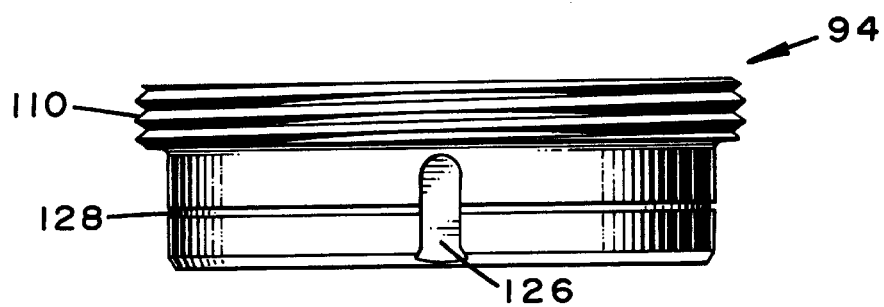
FIG. 18 is a right side elevation of the coupling member of FIG. 16.
Figure 19:
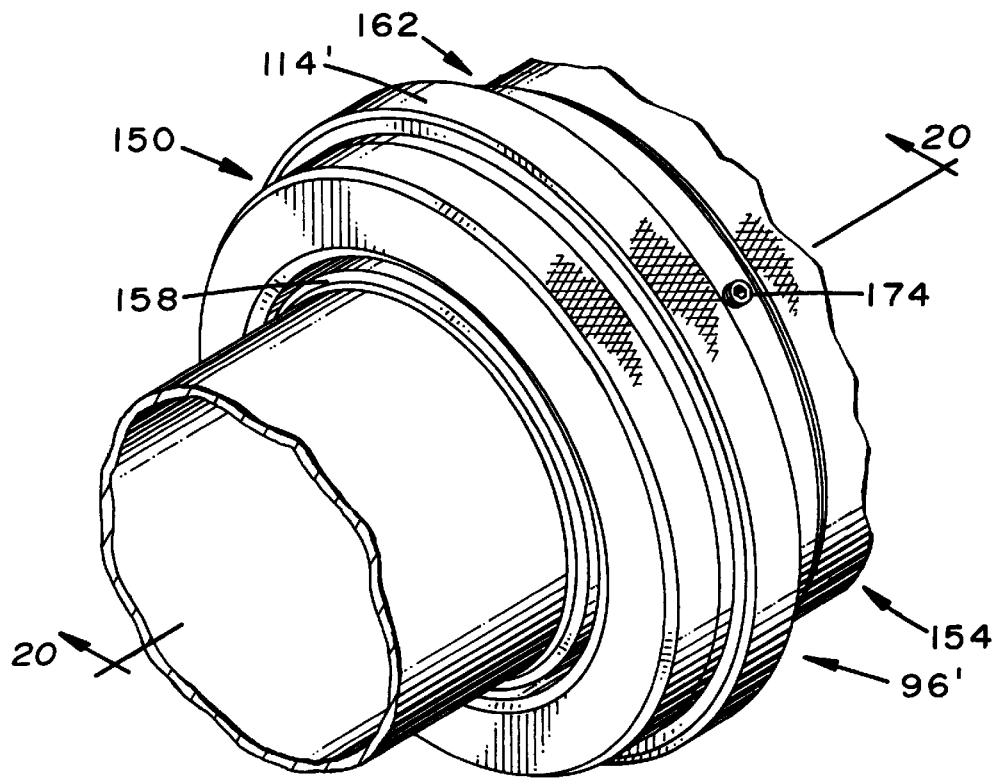
FIG. 19 is a perspective view of a third embodiment a the coupling assembly of this invention.

As shown in FIGS. 13 through 18, lock ring 96 has an annular rim 114, an outer peripheral web or wall 115 and inner peripheral web or wall 116 extending parallel to wall 115, wall 116 serving as a peripheral facing surface. A recess 119, shown in FIG. 14, is formed between wall 115 and wall 116 for receiving annular spring 40' as described below. Annular rim 114 may have a roughened surface to facilitate gripping it during locking or unlocking of coupling assembly 90. Extending inwardly from wall 116 on opposite sides thereof is a narrow tab or key 120 and a wide tab or key 122 which are sized to be received in narrow keyway 124 and wide keyway 126, respectively, formed longitudinally along the peripheral surface of body 106 of coupler 94 from the end thereof opposite threads 110 to angularly position, and thereby orient, lock ring 96 with respect to lock nut 98. Conveniently, keyways 124 and 126 intersect peripheral groove 128, formed in body 106, which receives tabs 48' of annular spring 40' to hold the lock ring and annular spring assembly in position on coupler 94. Annular spring 40' has a spring tab 50' which is the same width as wide tab 122 which operates with wide keyway 126 to angularly position annular spring 40' with respect to both lock ring 96 and coupler 94. Web 116 also includes complementary locking elements having configurations which are reliefs in the form of annular slots 130 and 132. The annular slots are opposite each other and are located at different radial distances on web 116, as best seen in FIG. 16. These slots provide a means for positive locking engagement with lock nut 98, as more fully explained below.

Lock nut 98 has a generally cylindrical body 134 with a knurled external gripping surface 135 and internal threads 136 which are engageable with external threads 108 of coupler 94. Body 134 also has indicia in the form of an indicator stripe 138 which provides the mechanic with a visual indication of whether or not the coupling assembly is in a positive locked position. The peripheral facing surface 140 of body 134 has complementary locking elements, such as a pair of angularly spaced protrusions in the form of arcuate locking tabs 142 and 144. These locking tabs are opposite each other and are located at different radial distances which correspond to the radial location of annular slots 130 and 132, respectively. Thus, during rotation in the locking direction locking tab 142 will not align with arcuate slot 132 and locking tab 144 will not align with arcuate slot 130. However, upon further rotation to the point where locking tab 142 is aligned with arcuate slot 130 and locking tab 144 is aligned with arcuate slot 132, annular spring 40' will snap lock ring 96 to the left, as viewed in FIG. 14, causing the respective locking tabs and arcuate slots to move into locking engagement with each other. Conveniently, lock nut 98 has an exterior gripping surface 146 for assisting the mechanic in rotating the nut in either the locking or unlocking direction.

To fasten coupling assembly 90, first, annular spring 40' is deformed sufficiently to position it within recess 119 with its spring fingers 44' bearing against the inner surface of web 116 to form a lock ring and spring assembly. This assembly is slid over body 106 and is positioned so that spring tab 50' and wide tab 122 are aligned with wide keyway 126 and narrow tab 120 is aligned with narrow keyway 124 to properly orient lock ring 96 and angular spring 40' with coupler 94. One flange 102 of coupler 92 and washer 103 are seated in lock nut 98 which is rotated with respect to lock ring 96 and coupler 94 to engage threads 136 with threads 110 and so that the coupling assembly is releasably locked together as discussed above. The coupling assembly 90 can be uncoupled as described with respect to the previous embodiment.

Figure 20:
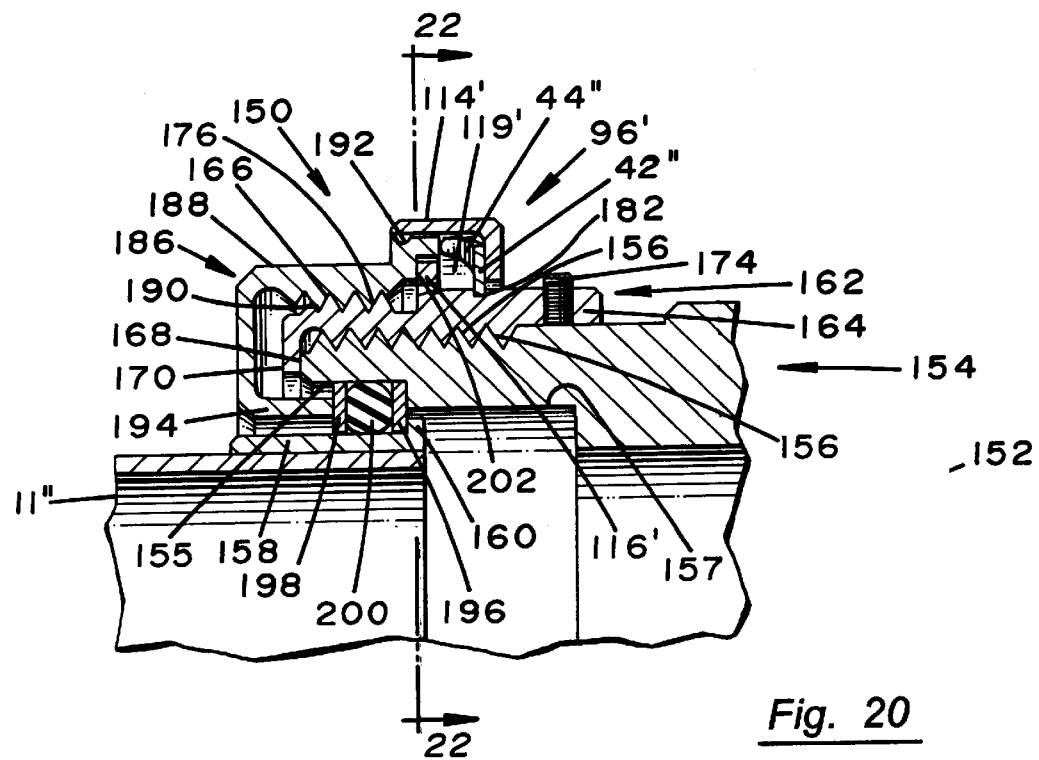
FIG. 20 is an enlarged fragmentary longitudinal section, taken along line 20—20 of FIG. 19.
Figure 21:
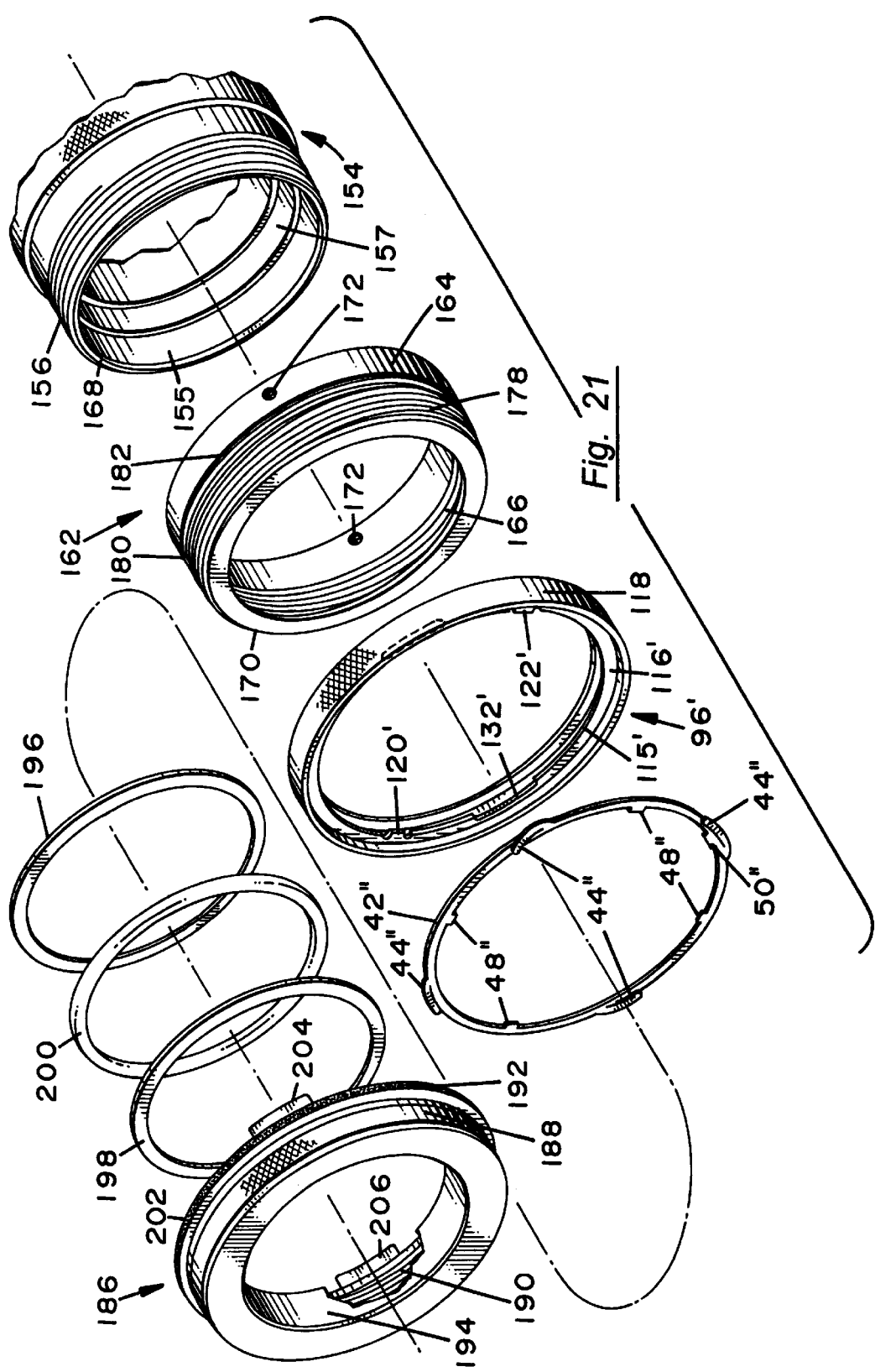
FIG. 21 is an exploded perspective view of the coupling assembly of FIG. 19.

A third embodiment of a positive lock coupler, such as "half coupler" 150, is shown in FIGS. 19–24 which is intended for use with a standard component (not shown), such as a pump, filter or valve. The component utilizes a conventional fitting 154. This fitting has external threads 156, a standard seal cavity 155 and a standard clearance cavity 157, as shown, and is releasably attached to conduit 11" which has a flange 158 with an outwardly extending peripheral edge 160, as seen in FIG. 20. Conduit 11" is axially and angularly adjustable with respect to fitting 54.

A flange adapter 162 has a generally cylindrical body 164 provided which has internal threads 166 for receiving threads 156 of fitting 154. Threads 156 are clocked to threads 166 so that the forward end 168 abuts inwardly extending peripheral flange 170 on flange adapter 162. Body 164 has a pair of oppositely spaced tapped holes 172 for receiving, such as set screw 174, shown in FIGS. 19 and 20. These set screws serve as locking devices to secure flange adapter 162 to fitting 154 to prevent relative rotation therebetween. Additional tapped holes and set screws can be provided, if desired. Flange adapter 162 also has external threads 176 for receiving a locking nut, as described below. Body 164 also has a wide slot 178 and a narrow slot 180, extending longitudinally along the surface thereof from threads 176 toward the outer end thereof and peripherally spaced from tapped holes 172, to facilitate the mounting of lock ring 96' thereon. Body 164 also has a peripheral groove 182 for receiving annular spring 40".

Figure 22:
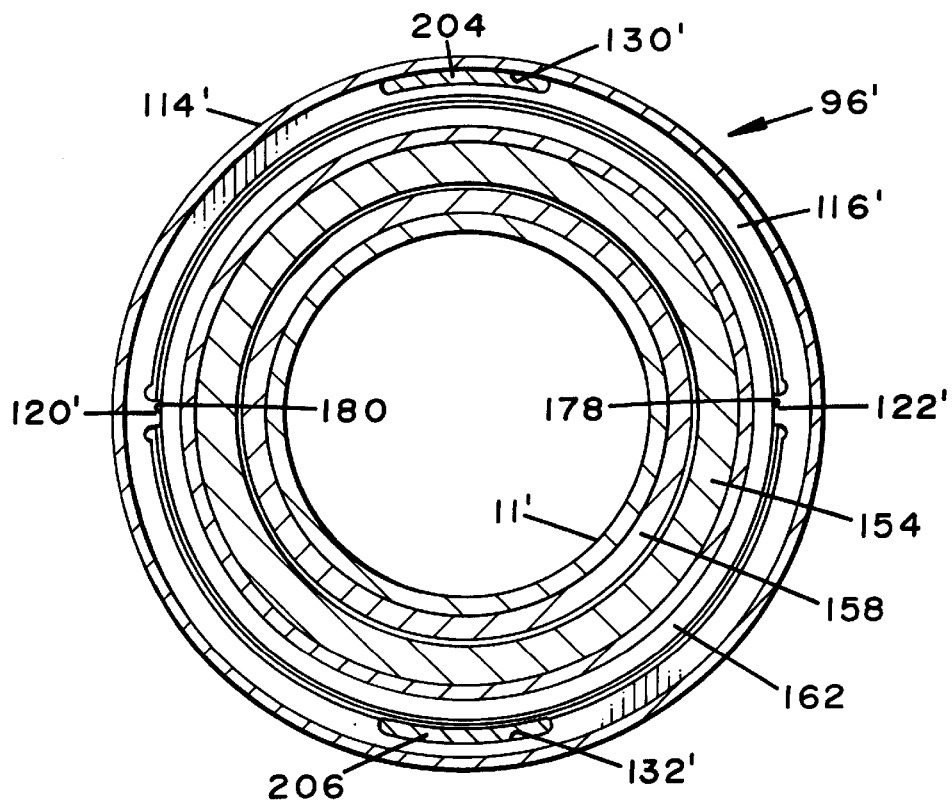
FIG. 22 is an enlarged vertical section, taken along line 22—22 of FIG. 20, showing the lock ring positioned on the coupling member.
Figure 23:
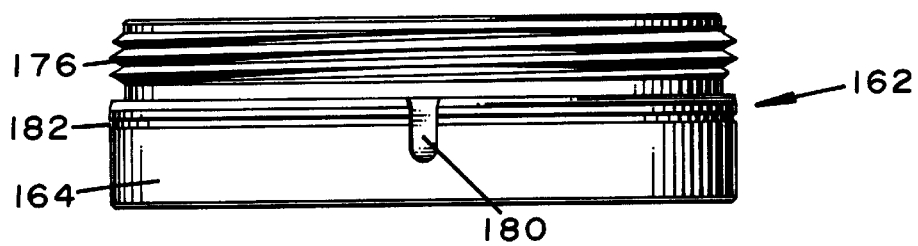
FIG. 23 is a left side elevation of the coupling member of FIG. 22.
Figure 24:
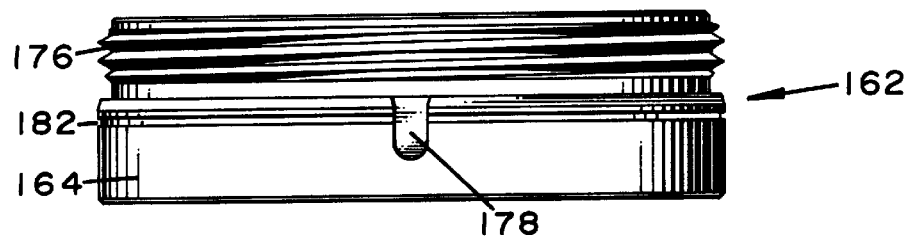
FIG. 24 is a right side elevation of the coupling member of FIG. 22.

Annular spring 40" is similar to annular springs 40 and 40' of the previous embodiments, respectively. Also, lock ring 96' is similar to lock ring 96 of the previous embodiment. Thus, the lock ring assembly is formed by inserting annular spring 40" in the space 119' formed between outer wall 115' and parallel peripheral web 116', which extend from annular rim 114' as seen in FIG. 20, so that fingers 44" bear against web 116'. Key 50" is received in wide keyway 178 for angularly positioning the spring. Peripherally spaced spring tabs 48" are received within peripheral groove 182 on flange adapter 162 to hold spring 40" in place thereon. During assembly, wide tab 122' is aligned with key 50" of annular spring 40". When this assembly is slid over the threaded end of flange adapter 162, wide tab 122' and key 50" are received in wide keyway 178 and narrow tab 120' is received in narrow keyway 180, as best seen in FIG. 22. Conveniently, keyways 178 and 180 each intersect peripheral groove 182 so that spring 40" can be axially slid along flange adapter 162 to position spring tabs 48" in peripheral groove 182. Web 116' has a long annular slot 130' and a short annular slot 132' formed therein for receiving corresponding locking tabs to releasably lock half coupler 150, as described below.

Lock nut 186 has a knurled peripheral surface 188 and internal threads 190 which engage external threads 174 of flange adapter 162. Lock nut 186 also has indicia on the peripheral surface thereof, such as stripe 192 and an internal annular bearing flange 194. Spaced inner washer 196 and outer washer 198 have an O-ring therebetween. Inner washer 196 bears against peripheral edge 160 of flange 158 so that when lock nut 186 is tightened, O-ring 200 is compressed between the washers thereby forming a water-tight seal. Lock nut 186 has a peripheral facing surface 202 from which a long narrow annular locking tab 204 and a short wider annular locking tab 206 extend. These locking tabs are peripherally spaced, as shown, and cooperate with annular slots 130' and 132', as in the previous embodiments. More specifically, as lock nut 186 is tightened, locking tabs 204 and 206 will engage web 116' thereby moving lock ring 96' to the right, as viewed in FIG. 20, against the force of spring fingers 44" of annular spring 40". When annular locking tabs 204 and 206 become aligned, respectively, with annular slots 130' and 132', they will snap into locking engagement and lock ring 96' will snap to the left under the force of spring fingers 48", as viewed in FIG. 20, causing annular rim 114' to cover stripe 192 thereby signifying that the half coupler 150 is in locked position.

Half coupler 150 can be unlocked by moving lock ring 96' to the right, as viewed in FIG. 20, against the force of annular spring 40" so as to disengage locking tabs 204 and 206 from slots 130' and 132', respectively. Lock nut 186 is then rotated in the unlocking direction to separate the coupling.

From the foregoing, the advantage of this invention are readily apparent. A coupling assembly has been provided in the various embodiments wherein a positive engagement is obtained between the nut and the coupler which can be accomplished with one hand. Also, indicia in the form of an indicator stripe is provided which shows the mechanic whether or not the coupling is in the positive lock position. The complementary locking elements in the first embodiment have arcuate tabs and slots with complementary lengths and widths. The second and third embodiments have complementary tabs and slots of substantially the same length and width but spaced at different radial distances so that the appropriate tabs and slots become aligned for locking engagement. It will be understood that other complementary shapes or configurations which can releasably engage each other could be used. Additionally, the couplers of this invention have angularly spaced slots of different widths for receiving a key on an annular spring and tabs of corresponding widths on a locked nut for angularly positioning them with respect to the coupler. Longitudinal keyways of varying width are provided along the coupler surface which cooperate with corresponding tabs on an annular spring and a lock ring to angularly position them with respect to the coupler. These keyways intersect a peripheral groove which locates and positions the annular spring and lock ring on the coupler.

This invention has been described in detail with reference to particular embodiments thereof, but it will be understood that various other modifications can be effected without departing from the spirit and scope of this invention.

What is claimed is:

1. A threaded coupling apparatus for interconnecting ends of first and second fluid-carrying conduit members in a fixed releasable locking relationship, said apparatus comprising:

first and second coupling members circumferentially engageable with the ends of the conduit members to hold them in fluid communication, said coupling members each having annular outer surfaces and being rotatable with respect to each other in a locking direction to a locked position and rotatable in an opposite unlocking direction to an unlocked position, said second coupling member having a peripheral groove in said annular outer surface thereof;

a first peripheral facing surface located on said first coupling member;

a lock ring located on said second coupling member, said lock ring having an annular wall forming a second peripheral facing surface which faces said first peripheral facing surface and an internal peripheral retaining groove;

a first complementary locking element located on said first peripheral facing surface;

a second complementary locking element located on said second peripheral facing surface configured for locking engagement with said first complementary locking element;

first and second cooperating elements on said first and second coupling members, respectively for moving said first and second peripheral facing surfaces toward each other when said coupling members are rotated in the locking direction; and an annular spring mounted within said internal peripheral retaining groove of said lock ring, said annular spring having an inner peripheral edge with a plurality of peripherally spaced spring tabs extending therefrom and received in said peripheral groove of said second coupling member, said annular spring urging said second peripheral facing surface of said lock ring toward said first peripheral facing surface of said first coupling member so that said complementary locking elements become aligned and subsequently lock into each other resulting in the complementary locking elements being in a fixed and locked position.

2. Apparatus, as claimed in claim 1, wherein said annular spring further comprises:

a plurality of peripherally spaced fingers formed on said annular ring and which extend toward said lock ring and are engageable with said internal peripheral retaining groove of said lock ring for urging said second peripheral facing surface of said lock ring against said first peripheral facing surface of said first coupling member.

3. Apparatus, as claimed in claim 1, further including:

a longitudinally extending first keyway, having a first width, formed in said annular outer surface of said second coupling member which intersects said peripheral groove;

a spring key of substantially said first width located on said inner peripheral edge of said annular spring which is placed in said first keyway to angularly orient said annular spring with said second coupling member.

4. Apparatus, as claimed in claim 3, further including:

a first lock ring key of substantially said first width extending from said inner peripheral edge of said annular spring positioned in said first keyway to angularly orient said annular spring with said lock ring and said second coupling member.

5. Apparatus, as claimed in claim 4, further including:

a longitudinally extending second keyway, having a second width, formed in said annular outer surface of said second coupling member, angularly spaced from said first keyway, and intersecting said peripheral groove; and a second lock ring key of substantially said second width extending from said inner peripheral edge of said annular spring, angularly spaced from said first lock ring key a distance equal to the angular spacing of said first and second keyways and positioned in said second keyway.

6. Apparatus, as claimed in claim 5, wherein:

said second cooperating element has an outer diameter greater than the diameter of said internal peripheral edge of said annular spring; and said first and second keyways each extend longitudinally along said annular outer surface of said second coupling member toward said second cooperating element.

7. Apparatus, as claimed in claim 6, wherein:

a sealing flange is formed in said first coupling member, said sealing flange having a first peripheral sealing surface;

said second cooperating element is an externally threaded element which has a second peripheral sealing surface;

an annular recess in one of said first and second peripheral sealing faces; and a seal positioned within said annular recess for engagement with said other of said first and second sealing surfaces to form a fluid-tight seal when said coupling apparatus is in the locked position.

8. A threaded coupling apparatus for interconnecting ends of first and second fluid-carrying conduit members in a fixed releasable locking relationship, said apparatus comprising:

first and second coupling members circumferentially engageable with the ends of the conduit members to hold them in fluid communication, said coupling members each having annular outer surfaces and being rotatable with respect to each other in a locking direction to a locked position and rotatable in an opposite unlocking direction to an unlocked position, said second coupling member having a peripheral groove in said annular outer surface thereof and internal threads for threadably receiving a standard coupling member having external threads;

a locking device for releasably securing said second coupling member to the standard coupling member to prevent relative rotation therebetween;

a first peripheral facing surface located on said first coupling member;

a lock ring located on said second coupling member, said lock ring having an annular wall forming a second peripheral facing surface which faces said first peripheral facing surface and an internal peripheral retaining groove;

a first complementary locking element located on said first peripheral facing surface;

a second complementary locking element located on said second peripheral facing surface configured for locking engagement with said first complementary locking element;

first and second cooperating elements on said first and second coupling members, respectively for moving said first and second peripheral facing surfaces toward each other when said coupling members are rotated in the locking direction; and an annular spring mounted within said internal peripheral retaining groove of said lock ring, said annular spring having an inner peripheral edge with a plurality of peripherally spaced spring tabs extending therefrom and received in said peripheral groove of said second coupling member, said annular spring urging said second peripheral facing surface of said lock ring toward said first peripheral facing surface of said first coupling member so that said complementary locking elements become aligned and subsequently lock into each other resulting in the complementary locking elements being in a fixed and locked position.

9. Apparatus, as claimed in claim 8, wherein said second coupling member further includes:

an inwardly extending peripheral flange which provides a stop for the standard coupling member when it is fully threadably engaged with said second coupling member.

10. Apparatus, as claimed in claim 8, wherein:

said internal threads are clocked to the external threads of the standard coupling member.

11. Apparatus, as claimed in claim 8, wherein said annular spring further comprises:

a plurality of peripherally spaced fingers formed on said annular ring and which extend toward said lock ring and are engageable with said internal peripheral retaining groove of said lock ring for urging said second peripheral facing surface of said lock ring against said first peripheral facing surface of said first coupling member.

12. Apparatus, as claimed in claim 8, further including:

a longitudinally extending first keyway, having a first width, formed in said annular outer surface of said second coupling member which intersects said peripheral groove;

a spring key of substantially said first width located on said inner peripheral edge of said annular spring which is placed in said first keyway to angularly orient said annular spring with said second coupling member.

13. Apparatus, as claimed in claim 12, further including:

a first lock ring key of substantially said first width extending inward from said inner peripheral edge of said annular spring positioned in said first keyway to annularly orient said annular spring with said lock ring and said second coupling member.

14. Apparatus, as claimed in claim 13, further including:

a longitudinally extending second keyway, having a second width, formed in said annular outer peripheral surface of said second coupling member, angularly spaced from said first keyway, and intersecting said peripheral groove; and a second lock ring key of substantially said second width extending inward from said inner peripheral edge of said annular spring, angularly spaced from said first lock ring key a distance equal to the annular spacing of said first and second keyways and positioned in said second keyway.

15. Apparatus, as claimed in claim 14, wherein:

said second cooperating element has an outer diameter greater than the diameter of said internal peripheral edge of said annular spring; and said first and second keyways each extend longitudinally along said annular outer surface of said second coupling member toward said second cooperating element.

16. Apparatus, as claimed in claim 15, wherein:

a sealing flange is formed in said first coupling member, said sealing flange having a first peripheral sealing surface;

said second cooperating element is an externally threaded element which has a second peripheral sealing surface;

an annular recess in one of said first and second peripheral sealing faces; and a seal positioned within said annular recess for engagement with said other of said first and second sealing surfaces to form a fluid-tight seal when said coupling apparatus is in the locked position.

17. A threaded coupling apparatus for interconnecting ends of first and second fluid-carrying conduit members in a fixed releasable locking relationship, said apparatus comprising:

first and second coupling members circumferentially engageable with the ends of the conduit members to hold them in fluid communication, said coupling members each having annular outer surfaces and being rotatable with respect to each other in a locking direction to a locked position and rotatable in an opposite unlocking direction to an unlocked position, said second coupling member having a peripheral groove in said annular outer surface thereof and an outer diameter greater than the diameter of said internal peripheral edge of said annular spring;

a first peripheral facing surface located on said first coupling member;

a lock ring located on said second coupling member, said lock ring having an annular wall forming a second peripheral facing surface which faces said first peripheral facing surface and an internal peripheral retaining groove;

a first complementary locking element located on said first peripheral facing surface;

a second complementary locking element located on said second peripheral facing surface configured for locking engagement with said first complementary locking element;

first and second cooperating elements on said first and second coupling members, respectively for moving said first and second peripheral facing surfaces toward each other when said coupling members are rotated in the locking direction;

an annular spring mounted within said internal peripheral retaining groove of said lock ring, said annular spring having an inner peripheral edge with a plurality of peripherally spaced spring tabs extending therefrom and received in said peripheral groove of said second coupling member, said annular spring urging said second peripheral facing surface of said lock ring toward said first peripheral facing surface of said first coupling member so that said complementary locking elements become aligned and subsequently lock into each other resulting in the complementary locking elements being in a fixed and locked position;

a longitudinally extending first keyway, having a first width, formed in said annular outer surface of said second coupling member which intersects said peripheral groove and extends longitudinally along said annular outer surface of said second coupling member toward said second cooperating member;

a spring key of substantially said first width located on said inner peripheral edge of said annular spring which is placed in said first keyway to angularly orient said annular spring with said second coupling member;

a first lock ring key of substantially said first width extending from said inner peripheral edge of said annular spring positioned in said first keyway to angularly orient said annular spring with said lock ring and said second coupling member;

a longitudinally extending second keyway, having a second width, formed in said annular outer surface of said second coupling member, angularly spaced from said first keyway, which intersects said peripheral groove and extends longitudinally along said annular outer surface of said second coupling member toward said second cooperating member; and a second lock ring key of substantially said second width extending from said inner peripheral edge of said annular spring, angularly spaced from said first lock ring key as distance equal to the angular spacing of said first and second keyways and positioned in said second keyway.

* * * * *